(12) United States Patent
Hartel et al.

(10) Patent No.: US 6,401,940 B1
(45) Date of Patent: Jun. 11, 2002

(54) FRAME FOR A SWITCH CABINET

(75) Inventors: Marc Hartel, Reiskirchen; Walter Nicolai, Buseck; Horst Besserer; Rolf Benner, both of Herborn, all of (DE)

(73) Assignee: Rittal-Werk Rudolf Loh GmbH & Co. KG, Herborn (DE)

( * ) Notice: Subject to any disclaimer, the term of this patent is extended or adjusted under 35 U.S.C. 154(b) by 0 days.

(21) Appl. No.: 09/646,366
(22) PCT Filed: Mar. 13, 1999
(86) PCT No.: PCT/EP99/01667
§ 371 (c)(1),
(2), (4) Date: Sep. 18, 2000
(87) PCT Pub. No.: WO99/48179
PCT Pub. Date: Sep. 23, 1999

(51) Int. Cl.[7] ................................................. A47F 5/00
(52) U.S. Cl. ...................... 211/26; 211/182; 312/265.4; 361/829
(58) Field of Search ........................... 211/26, 189, 182; 312/265.1, 265.2, 265.3, 265.4, 265.5, 265.6; 361/829

(56) References Cited

U.S. PATENT DOCUMENTS

| 5,016,765 A | * | 5/1991 | Leonardo | ..................... 211/189 |
| 5,372,262 A | * | 12/1994 | Benson et al. | ................ 211/26 |
| 5,536,029 A | * | 7/1996 | Kostic | ..................... 312/265.3 |
| 5,536,079 A | | 7/1996 | Kostic | |
| 6,174,034 B1 | * | 1/2001 | Benner et al. | ............. 211/26 X |
| 6,238,029 B1 | * | 5/2001 | Marzec et al. | ............. 211/26 X |

FOREIGN PATENT DOCUMENTS

| DE | 29 21 865 C2 | 8/1889 |
| DE | 93 04 630.8 | 7/1993 |
| DE | 196 47 803 C1 | 3/1998 |
| DE | 43 41 943 | 5/1999 |

* cited by examiner

Primary Examiner—Robert W. Gibson, Jr.
(74) Attorney, Agent, or Firm—Pauley Petersen Kinne & Erickson

(57) ABSTRACT

A frame for a switch cabinet, having vertical profiled frame parts, a floor frame and a cover frame. The floor frame and the cover frame are configured as punched, bent parts made of a steel-sheet blank and have a horizontal floor facing the switch cabinet interior on which floor the vertical profiled frame parts are fixed. The floor has a reinforced edge which is bent away from the switch cabinet interior. To be able to assemble this type of frame simply and rapidly, four plug-in protuberances are fixed to the floor of the floor frame and the cover frame, which each have at least one threaded recess. The vertical profiled frame parts have plug-in recesses by which they are inserted onto the plug-in protuberances. The vertical profiled frame parts also have screw holes which are arranged such that they align with the threaded recesses of the plug-in protuberance and fixing screws are threaded into the screw holes and screwed into the threaded recesses.

9 Claims, 2 Drawing Sheets

FRAME FOR A SWITCH CABINET

Figure 1:
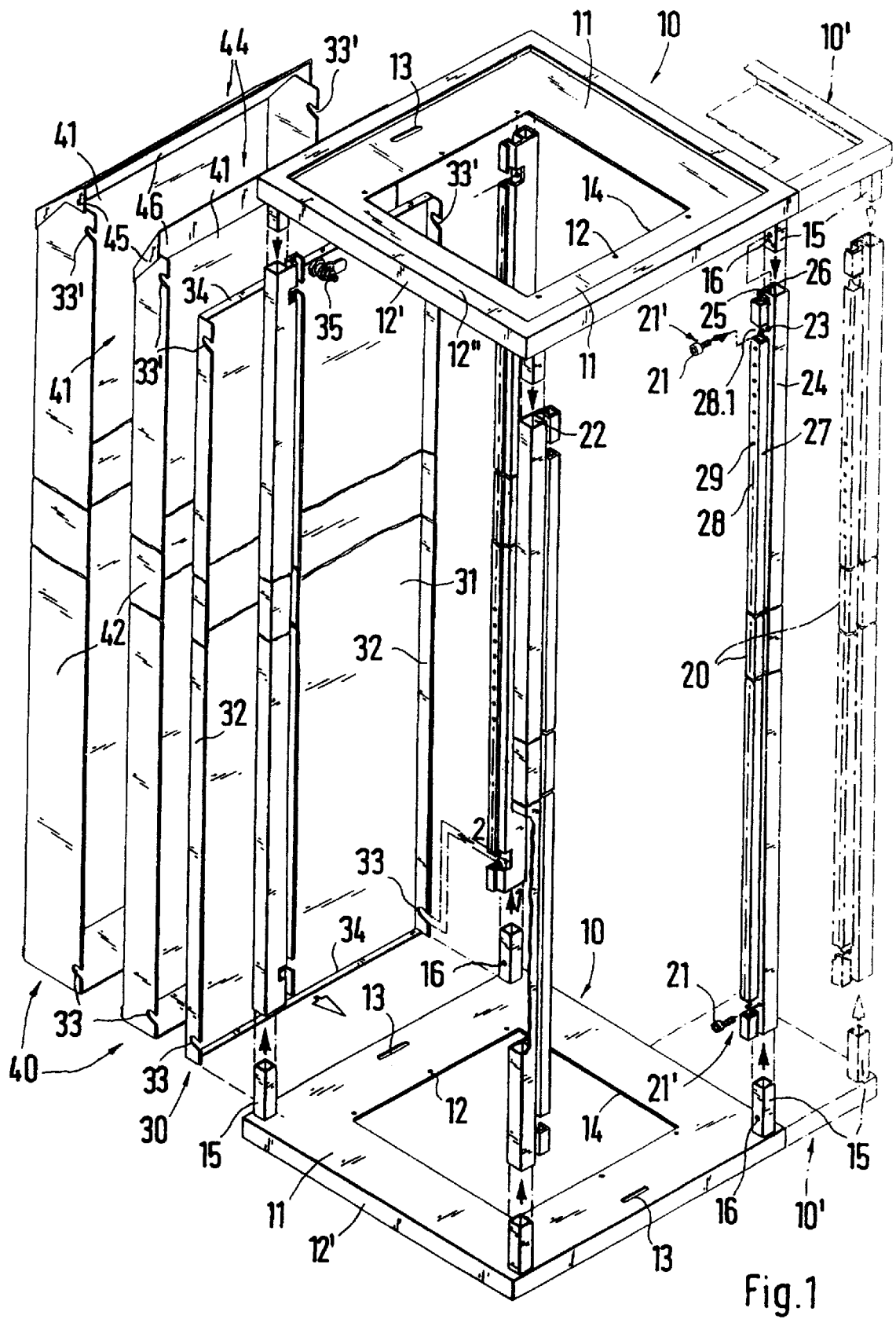

The invention relates to a rack for a switchgear cabinet with vertical profiled frame sections, a bottom frame and a top frame, wherein the bottom frame and the top frame are made as a stamped and bent part from a sheet steel blank and have a horizontal bottom facing the interior of the switchgear cabinet, on which the vertical profiled frame sections are fastened, and wherein a reinforced edge is bent off and pointed away from the interior of the switchgear cabinet.

Such a rack is known from DE 43 41 943 A1. The vertical profiled frame sections of such a rack are embodied as extruded profiled sections. They have threaded channels extending in the longitudinal direction. The front faces of these vertical profiled frame sections can be placed on the bottom of the bottom frame and fastened thereon. For this purpose the threaded channels are aligned flush with the threaded receivers, which were cut into the bottom. Thereafter, fastening screws can be placed from the underside through the threaded receivers and then screwed into the threaded channels.

It is the object of the invention to produce a rack of the type mentioned at the outset, which has a simple structure, and which can be simply and rapidly assembled.

This object of the invention is attained in that four plug-in projections are fastened on the bottom of the bottom frame and the top frame, each of which is provided with at least one threaded receiver, that the vertical profiled frame sections have plug-in receivers, by means of which they have been pushed on the plug-in projections, that the vertical profiled frame sections have screw receivers, which are arranged flush with the threaded receivers of the plug-in projection, and that fastening screws are inserted into the screw receivers and screwed into the threaded receivers.

For assembling the rack, the plug-in receivers of the vertical profiled frame sections can be pushed on the plug-in projections. Here, the bottom of the bottom frame, or respectively the top frame can be used as a stop, against which the front face of the vertical profiled frame section comes to rest. In this assembled position the vertical profiled frame section can then be simply fixed in place by means of a fastening screw. Assembly can be performed simply and quickly even by an unskilled person. This is aided above all by the small number of pieces to be assembled.

A simple design of the vertical profiled frame section results if it is provided that the plug-in receiver of the vertical profiled frame sections is constituted by a hollow profiled section, which is pointed into the interior of the switchgear cabinet with two profiled inner walls placed vertically in respect to each other, that a profiled wall extension adjoins one of the profiled inner walls, from which a leg is bent off, which is spaced apart from the hollow profiled section and which, together with the hollow profiled section and the profiled wall extension, forms a lateral wall receiver open toward the exterior. The bevelled edge of a lateral wall can be sealingly received in the lateral wall receiver.

In order to be able to fasten built-ins in the interior of the switchgear cabinet on the vertical profiled frame sections, a possible variation of the invention provides that the vertical profiled frame section has a fastening wall spaced apart from the hollow profiled section constituting the plug-in receiver, which is provided with rows of fastening receivers spaced apart from each other at even distances.

A preferred variation of the invention is distinguished in that the bottom frame and the top frame are identically embodied. So that cables can be easily introduced into the interior of the switchgear cabinet, it is conceivable that at least one opening, which is used as a cable inlet, is punched out of the bottom of the bottom frame and/or the top frame.

If it is provided that, adjoining the edge, a horizontally extending bevel is bent off the bottom frame, the frame can be directly placed on the floor with this bevel. In this case additional feet are not absolutely necessary.

Figure 2:
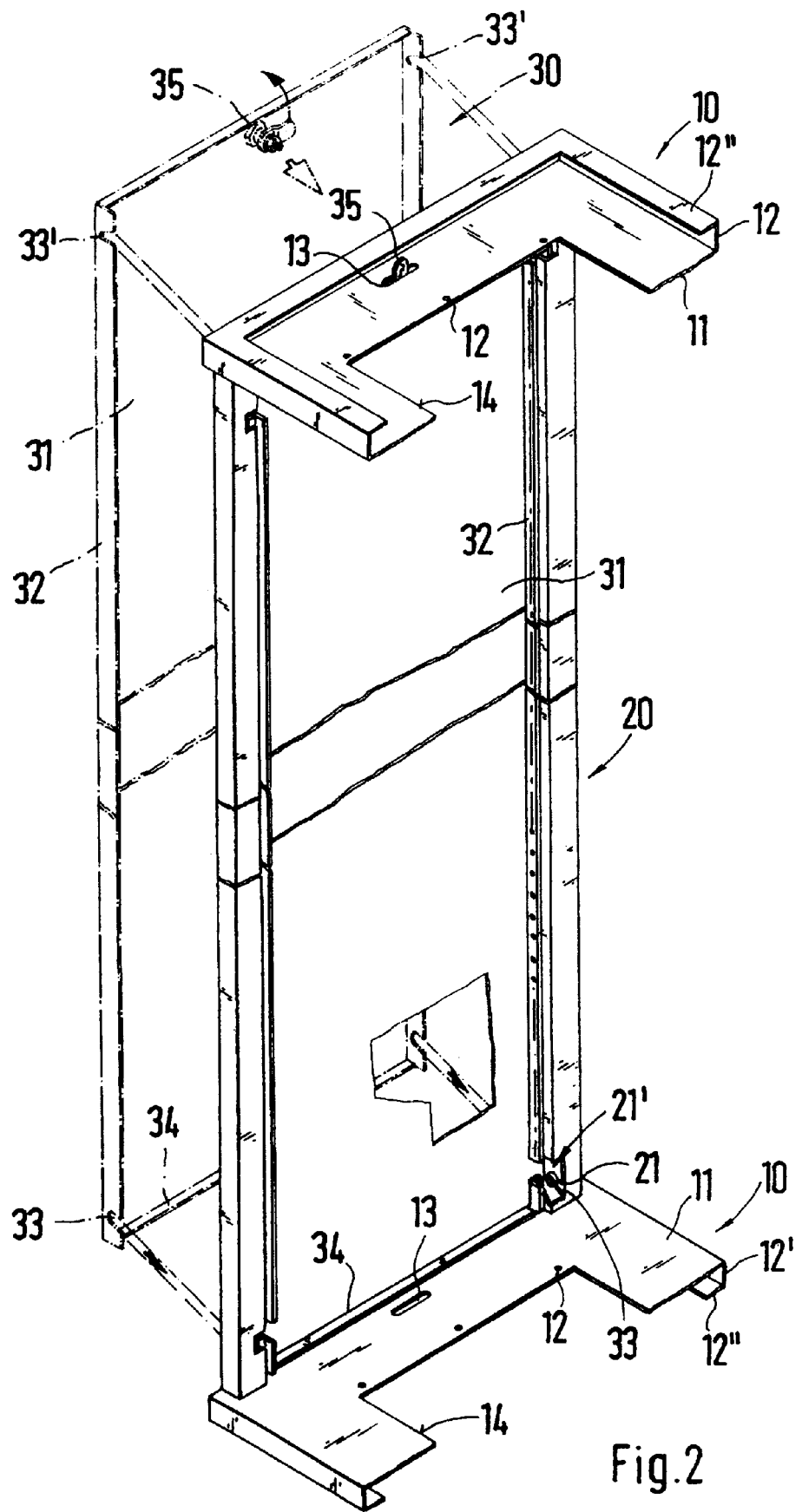

The invention will be explained in greater detail in what follows by means of an exemplary embodiment represented in the drawings. Shown are in:

FIG. 1, a rack of a switchgear cabinet in an exploded view, to which various wall elements can be selective attached, and FIG. 2, the rack in accordance with FIG. 1 with an installed wall element in a partial perspective representation.

A rack for a switchgear cabinet is represented in FIG. 1, which has a lower bottom frame and an upper top frame 10. These have been manufactured from a flat sheet steel blank. They have a horizontally oriented bottom 11, which is provided with bent-off edges 12' on its sides. The edges 12' make a transition into bevels 12", which are oriented parallel in respect to the bottom 11. Plug-in projections 15 are arranged in the corner areas of the bottom 11. These can be either screwed together with or welded to the bottom frame, or respectively top frame 10. The plug-in projections 15 have a threaded receiver 16 facing the interior of the switchgear cabinet. Plug-in receivers 22 of vertical profiled frame sections 20 can be pushed on the plug-in projections 15. Here, the vertical profiled frame sections 20 have a hollow square profiled section, whose interior cross section approximately corresponds to that of the exterior cross section of the plug-in connector 15. The profiled section sides of the hollow square profiled section are aligned parallel with the sides of the rack. An extension 25 is connected to a profiled section side facing the interior of the switchgear cabinet. One leg 26 of it is bent off toward the outside. The leg 26 is spaced apart from the hollow square profiled section. A receptacle, into which a wall element 30 with a bevel 32 can be inserted, is formed in this way between the hollow square profiled section and the leg 26. The leg 26 makes a transition into an outer wall 27, which extends parallel in respect to the associated side of the rack. The wall element 30, for example, can be supported by means of a seal on this outer wall 27. The outer wall 27 supports a supporting wall 28, which is pointed toward the interior of the switchgear cabinet. A row of fastening receivers 29, which are arranged at even distances from each other, has been cut into this supporting wall 28. When the vertical profiled frame sections 20 are pushed on the plug-in projections 15, the screw receivers 23 of the vertical profiled sections 20 are aligned flush with the threaded receivers 17 of the plug-in projections 15. Fastening screws 21' can be inserted into these screw receivers 23 and screwed into the threaded receivers 16. In this case, access to the screw receiver 23 is possible via an opening 28.1. The vertical profiled frame sections 20 are fixedly connected in this way with the bottom frame and top frame 10 of the rack.

The employment of bottom frames and top frames 10, 10' of different width is symbolized in a dashed representation in FIG. 1. The vertical profiled frame sections 20 remain unchanged when using the different base units 10, 10'.

The open sides of the rack can be covered by means of wall elements 30, 40 and a door, not represented in the drawings. It is suggested in FIG. 1 that different wall elements 30, 40 can be selectively installed on the rack. For example, the wall element 30 can be used. The wall element 30 has a flat, vertically oriented wall 31, which is provided with bevels 32, 34 on its edges. The bevels 32, 34 point in the direction toward the interior of the rack. The two vertical bevels 32 are provided with slit-shaped hinge bolt receivers 33. Here, the hinge bolt receivers 33 have been cut directed obliquely upward into the bevels 32. They have a open slit end, by means of which they can be pushed on the screw head of the fastening screw 21'. The screw head of the fastening screw 21' is used a hinge bolt 21. The wall element 30 can be pushed with its hinge bolt receivers 33 on the hinge bolt 21, so that a pivot seating with a horizontally oriented pivot axis is created. The wall element 30 can here be held at an angle in respect to the associated side of the rack without sliding off the hinge bolt 21. This is made possible by the obliquely cut-in hinge bolt receivers 33. A fastening element 35 embodied as a lock is provided for fixing the wall element 30 in place. In the flipped-in pivot position, the wall element 30 strikes the two upper fastening screws 21. For this purpose, the bevels 32 are provided with notches 33', which constitute the detents. The lock 35 can be turned in this mounted position, so that a tongue-shaped locking element of the lock can engage a slit-shaped locking receiver 13 of the bottom frame, or respectively the top frame 10.

A wall element 40, which has a bulge facing away from the interior of the switchgear cabinet, can also be installed in the rack in place of the wall element 30. This bulge is used as a cable conduit. Here, the bulge is formed by a lateral wall 41 and the bevels 42 adjoining it. In contrast to the bevels 32, 34 of the wall element 30, the bevels 42 of the wall element 40 have a greater structural depth. The wall element 40 is open in the upper area facing the base unit, and can be closed by means of a cover 44. The cover 44 has an upper sheet metal cover 46, which is followed by downward extending lateral elements 45. The lateral elements 45 extend over the bevels 42, so that an underside of the sheet metal cover 46 strikes the bevels 42. In this area the bevels 42 are slanted, so that the sheet metal cover 46 is also arranged at an angle in respect to a horizontal line. This makes an improved run-off of water possible. Two wall elements 40 are represented in FIG. 1, which can be selectively installed on the rack. These two wall elements 40 have different structural depths. In this way it is also possible, depending on the requirements of the user, to make different maneuvering spaces for cables available. The attachment of the walls 40 is performed in the same way as that of the walls 30. These are initially placed with hinge bolt receivers 33 on hinge bolts 21. The wall elements 40 can subsequently be moved into an upright position and fixed in place on the rack by means of fastening elements. The bevels 42 are again provided with the notches 33', which are used as detents. If the switchgear cabinet has been placed in a moisture-protected interior chamber, the lid 44 can be removed. Cables can be inserted through the cover 44 into the cable duct of the wall 40. The inserted cables can then branch off from the cable duct into the interior of the switchgear cabinet. Insertion of the cables is also possible through an opening 14 enclosed by the bottom frame and the top frame 10, 10'. The opening 14 can be closed off by means of cover plates, which are fastened on fastening receivers 12 arranged around the opening 14. Cable passages can also selectively be screwed to the fastening receivers 12.

The process for fastening a wall element 40 on the rack is represented in greater detail in FIG. 2.

What is claimed is:

1. In a rack for a switchgear cabinet having vertical profiled frame sections (20), a bottom frame and a top frame (10), wherein the bottom frame and the top frame (10) are a stamped and bent part from a sheet metal blank and have a bottom (11) on which the vertical profiled fame sections (20) are fastened, wherein a reinforced edge (12') is bent from the bottom, wherein four plug-in projections (15) are fastened on the bottom (11) of the bottom frame and the top frame (10), each of which has at least one threaded receiver (16), wherein the vertical profiled frame sections (20) have screw receivers (23) arranged flush with the threaded receivers (16) of the plug-in projections (15), and wherein fastening screws (21') are inserted into the screw receivers (22) and screwed into the threaded receivers (16), the improvement comprising:

the bottom (11) of the bottom frame and the top frame (10) facing an interior of the switchgear cabinet and the reinforced edge (12') oriented away from the interior of the switchgear cabinet, the bottom frame and the top frame (10) being identical; and the vertical profiled frame sections (20) having plug-in receivers (22) which push onto a front side of the plug-in projections (15).

2. In a rack for a switchgear cabinet having vertical profiled frame sections (20), a bottom frame and a top frame (10), wherein the bottom frame and the top frame (10) are a stamped and bent part from a sheet metal blank and have a bottom (11) on which the vertical profiled frame sections (20) are fastened, wherein a reinforced edge (12') is bent from the bottom, wherein four plug-in projections (15) are fastened on the bottom (11) of the bottom frame and the top frame (10), each of which has at least one threaded receiver (16), wherein the vertical profiled frame sections (20) have screw receivers (23) arranged flush with the threaded receivers (16) of the plug-in projections (15), and wherein fastening screws (21') are inserted into the screw receivers (22) and screwed into the threaded receivers (16), the improvement comprising:

the bottom (11) of the bottom frame and the top frame (10) facing an interior of the switchgear cabinet and the reinforced edge (12') oriented away from the interior of the switchgear cabinet;

the vertical profiled frame sections (20) having plug-in receivers (22) which push onto a front side of the plug-in projections (15);

the plug-in receivers (22) of the vertical profiled frame sections (20) formed by a hollow profiled section directed into the interior of the switchgear cabinet with two profiled inner walls positioned vertical with respect to each other; and a profiled wall extension (25) adjoining one of profiled inner walls from which a leg (26) is bent, which is spaced apart from a hollow profiled section and with the hollow profiled section and a profiled wall extension (25) forms a lateral wall receiver open toward an exterior of the switchgear cabinet.

3. In the rack in accordance with claim 2, wherein the vertical profiled frame section (20) has a fastening wall (28) spaced apart from the hollow profiled section forming the plug-in receiver (22), which has rows of fastening receivers (29) spaced apart from each other at even distances.

4. In the rack in accordance with claim 3, wherein
the bottom frame and the top frame (10) are identical.

5. In the rack in accordance with claim 4, wherein
the bottom (11) of at least one of the bottom frame and the top frame (10) has at least one opening (14).

6. In the rack in accordance with claim 5, wherein adjoining the reinforced edge (12') a horizontally extending bevel (12") is bent from the bottom frame (10).

7. In the rack in accordance with claim 1, wherein the vertical profiled frame section (20) has a fastening wall (28) spaced apart from the hollow profiled section forming the plug-in receiver (22), which has rows of fastening receivers (29) spaced apart from each other at even distances.

8. In the rack in accordance with claim 1, wherein the bottom (11) of at least one of the bottom frame and the top frame (10) has at least one opening (14).

9. In the rack in accordance with claim 1, wherein adjoining the reinforced edge (12') a horizontally extending bevel (12") is bent from the bottom frame (10).

* * * * *